United States Patent
Yuen

(10) Patent No.: US 7,003,792 B1
(45) Date of Patent: Feb. 21, 2006

(54) SMART AGENT BASED ON HABIT, STATISTICAL INFERENCE AND PSYCHO-DEMOGRAPHIC PROFILING

(75) Inventor: Henry C. Yuen, Pasadena, CA (US)

(73) Assignee: Index Systems, Inc., Tortola (VG)

( * ) Notice: Subject to any disclaimer, the term of this patent is extended or adjusted under 35 U.S.C. 154(b) by 0 days.

(21) Appl. No.: 09/449,887

(22) Filed: Nov. 30, 1999

Related U.S. Application Data

(60) Provisional application No. 60/110,301, filed on Nov. 30, 1998.

(51) Int. Cl.
*H04N 5/995* (2006.01)
*G06F 3/00* (2006.01)
*G06F 13/00* (2006.01)

(52) U.S. Cl. .......................................... 725/46; 725/47
(58) Field of Classification Search .................. 725/39, 725/46, 44, 45, 47, 9; H04N 5/445; G06F 3/00, G06F 13/00
See application file for complete search history.

(56) References Cited

U.S. PATENT DOCUMENTS

| | | | |
|---|---|---|---|
| 5,502,504 A | 3/1996 | Marshall et al. | 348/565 |
| 5,559,549 A | 9/1996 | Hendricks et al. | 348/6 |
| 5,572,442 A | 11/1996 | Schulhof et al. | 364/514 |
| 5,589,892 A | 12/1996 | Knee et al. | 348/731 |
| 5,600,364 A | 2/1997 | Hendricks et al. | 348/1 |
| 5,635,979 A | 6/1997 | Kostreski et al. | 348/13 |
| 5,657,072 A | 8/1997 | Aristides et al. | 348/13 |
| 5,663,757 A | 9/1997 | Morales | 348/13 |
| 5,666,293 A | 9/1997 | Metz et al. | 395/200.5 |
| 5,677,708 A | 10/1997 | Matthews, III et al. | 345/115 |
| 5,758,257 A * | 5/1998 | Herz et al. | 725/116 |
| 5,977,964 A * | 11/1999 | Williams et al. | 345/327 |
| 6,298,482 B1 * | 10/2001 | Seidman et al. | 725/101 |

FOREIGN PATENT DOCUMENTS

| | | |
|---|---|---|
| WO | WO94/23383 | 10/1994 |
| WO | WO97/17774 | 5/1997 |
| WO | WO97/26612 | 7/1997 |
| WO | WO97/41673 | 11/1997 |
| WO | WO99/04561 | 1/1999 |

OTHER PUBLICATIONS

"PCT International Search Report," Apr. 13, 2000, International Application No. PCT/US99/28335 (5 Pgs.).

* cited by examiner

Primary Examiner—Vivek Srivastava
(74) Attorney, Agent, or Firm—Fish & Neave IP Group of Ropes & Gray LLP

(57) ABSTRACT

A smart agent (SA) is provided which resides locally in a local client device and by iterative means integrates the habit, statistics and psycho-demographic information of a user to infer the user's preferences. The SA may also utilize the preferences to filter information delivered to the local device. The invention further discloses a means of collecting, combining, integrating and inferring information from the user to arrive at a psycho-demographic profile of the user, and a means of utilizing such psycho-demographic profile to select or filter information delivered to the user, thereby achieving targeting. The invention also discloses a means of classifying and identifying the information delivered so that it can be matched, filtered or selected.

46 Claims, 12 Drawing Sheets

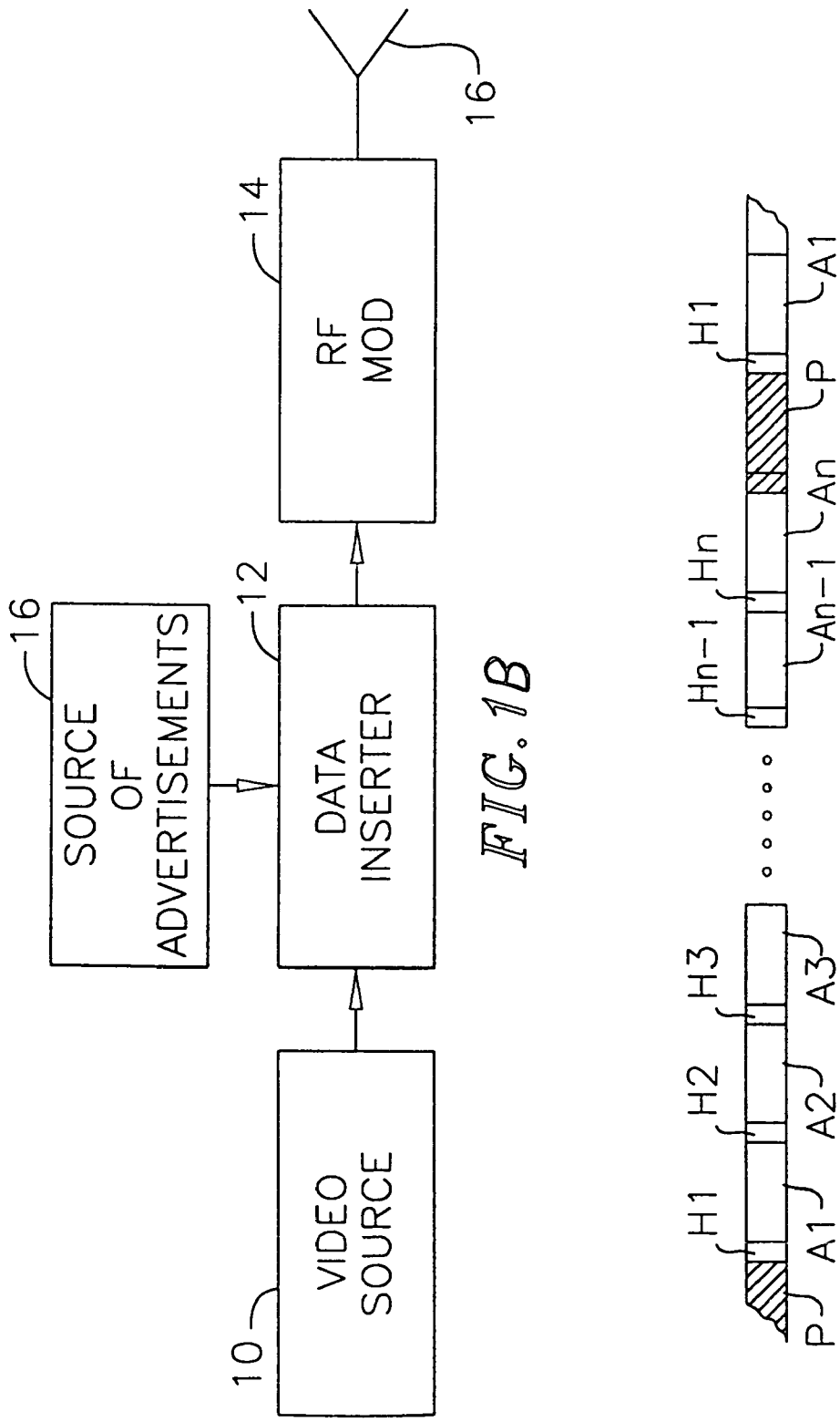

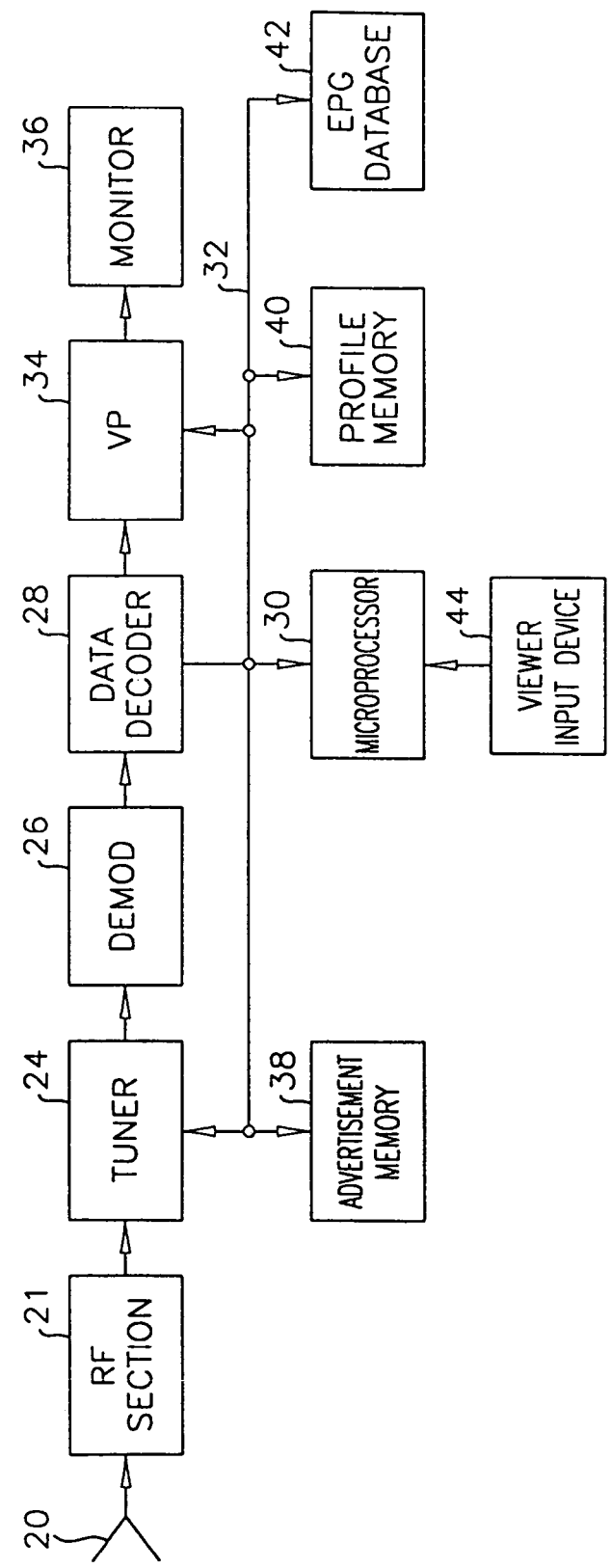

FIG. 7
PRE-ESTABLISHED TIME LIST

|   | 00-04 | 04-08 | 08-12 | 12-16 | 16-20 | 20-24 |
|---|---|---|---|---|---|---|
| 0 | $A_1$ | $B_1$ | $C_1$ | $D_1$ | $E_1$ | $F_1$ |
| 1 | $G_1$ | $H_1$ | $I_1$ | $J_1$ | $K_1$ | $L_1$ |
| 2 | $A_2$ | $B_2$ | $C_2$ | $D_2$ | $E_2$ | $F_2$ |
| 3 | $G_2$ | $H_2$ | $I_2$ | $J_2$ | $K_2$ | $L_2$ |
| 4 | $A_3$ | $B_3$ | $C_3$ | $D_3$ | $E_3$ | $F_3$ |
| 5 | $G_3$ | $H_3$ | $I_3$ | $J_3$ | $K_3$ | $L_3$ |
| ⋮ | | | | | | |
| $Z_N$ | $A_N$ | $B_N$ | $C_N$ | $D_N$ | $E_N$ | $F_N$ |
| $Z_{N+1}$ | $G_N$ | $H_N$ | $I_N$ | $J_N$ | $K_N$ | $L_N$ |

N = THE MAXIMUM NUMBER OF CHANNELS

FIG. 8
SHOW INFORMATION PACKAGE

- AMOUNT OF MEMORY USED
- CONTROL DATE
- VERSION NUMBER
- MULTIPLE SHOW FLAG | START TIME
- DURATION
- THEME
- CC | STEREO | ADD ONS
- TITLE LENGTH
- TITLE
- PRIMARY DESCRIPTION LENGTH
- PRIMARY DESCRIPTION
- SECONDARY DESCRIPTION LENGTH
- SECONDARY DESCRIPTION
- VCR PLUSCODE LENGTH
- VCR PLUSCODE
- END OF SHOW = NULL (Block 80)

- MULTIPLE SHOW FLAG | START TIME
- DURATION
- THEME
- CC | STEREO | ADD ONS
- TITLE LENGTH
- TITLE
- PRIMARY DESCRIPTION LENGTH
- PRIMARY DESCRIPTION
- SECONDARY DESCRIPTION LENGTH
- SECONDARY DESCRIPTION
- VCR PLUSCODE LENGTH
- VCR PLUSCODE
- END OF SHOW = NULL (Block 81)

⋮

- MULTIPLE SHOW FLAG | START TIME
- DURATION
- THEME
- CC | STEREO | ADD ONS
- TITLE LENGTH
- TITLE
- PRIMARY DESCRIPTION LENGTH
- PRIMARY DESCRIPTION
- SECONDARY DESCRIPTION LENGTH
- SECONDARY DESCRIPTION
- VCR PLUSCODE LENGTH
- VCR PLUSCODE
- END OF SHOW = NULL (Block 82)

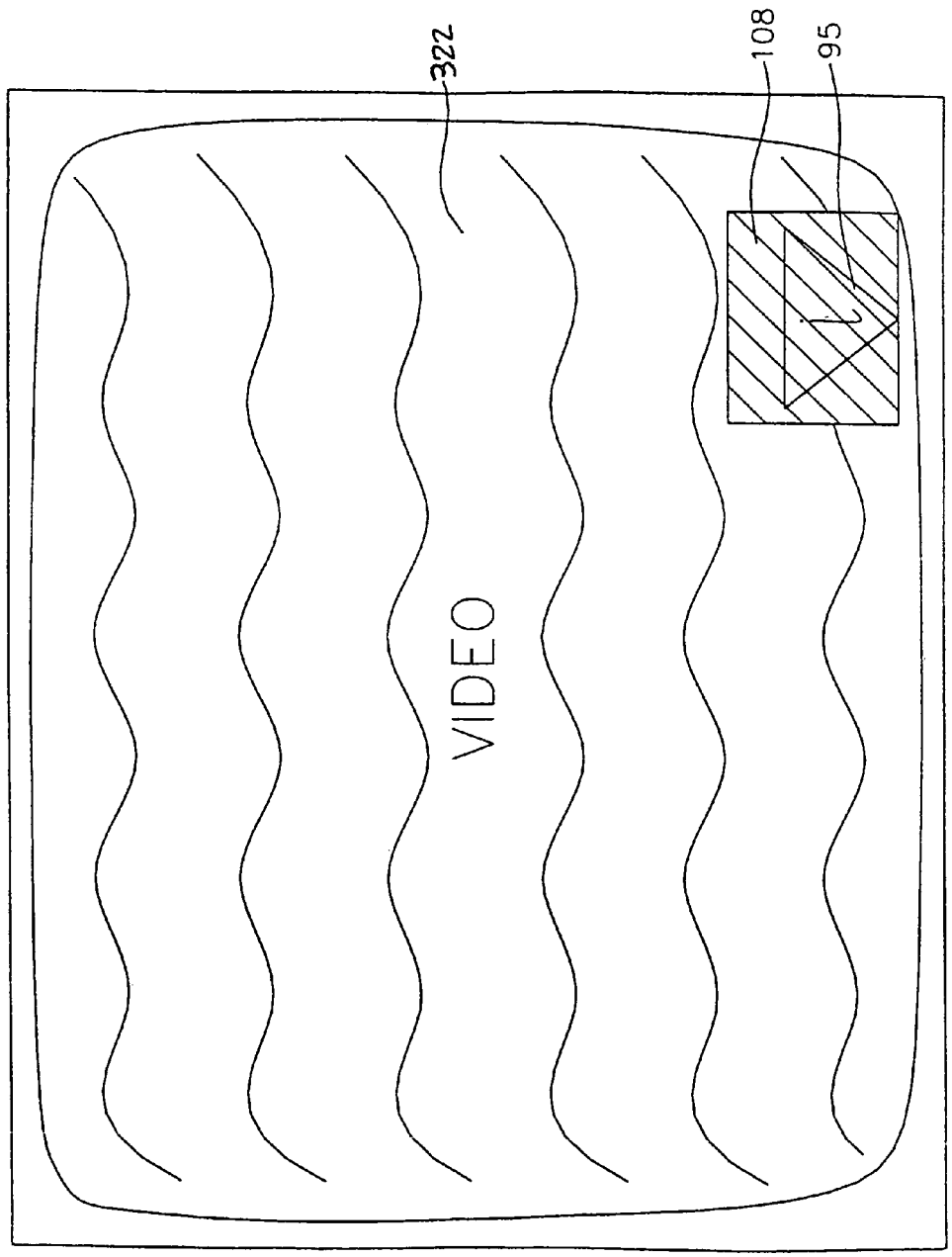

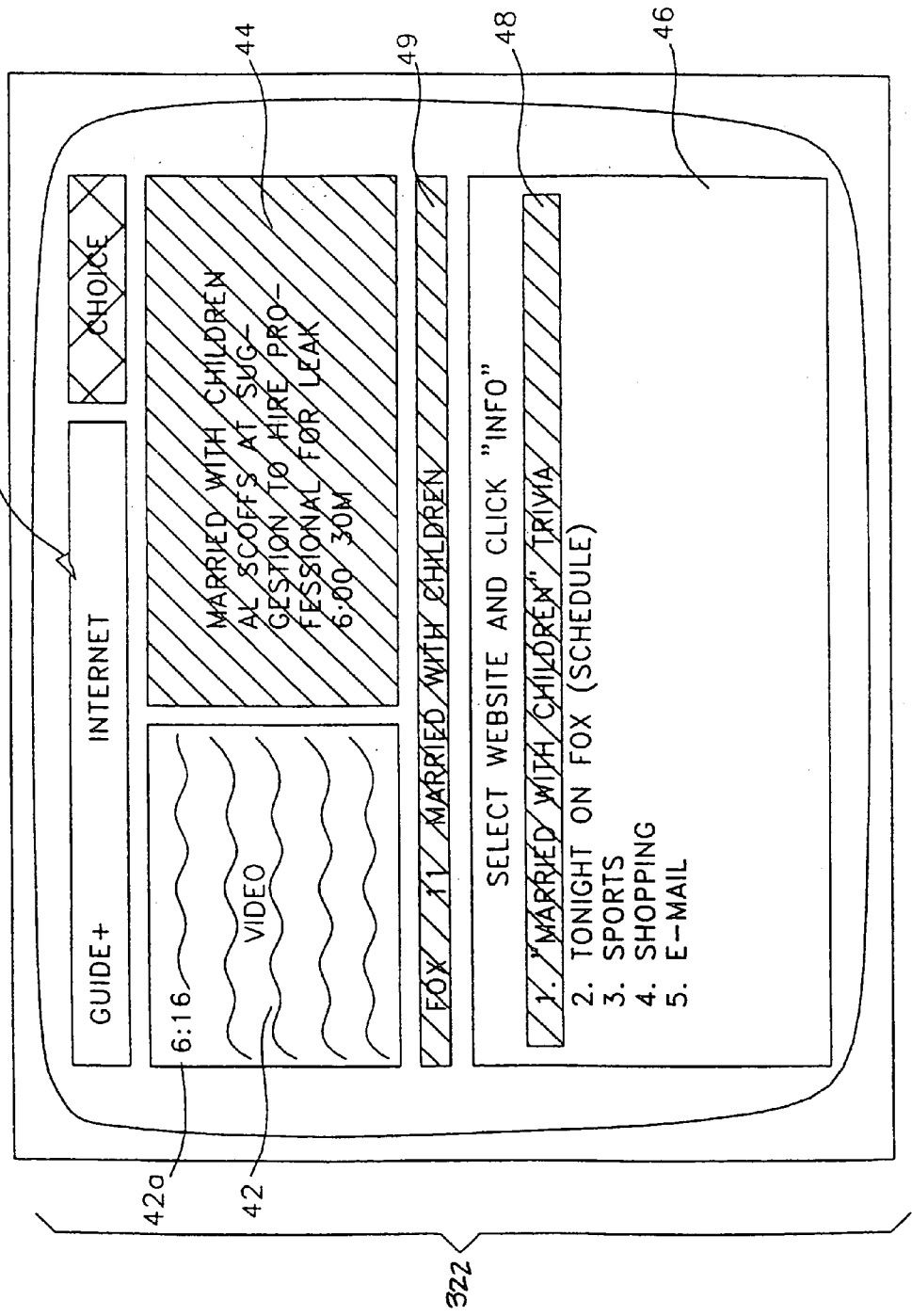

SMART AGENT BASED ON HABIT, STATISTICAL INFERENCE AND PSYCHO-DEMOGRAPHIC PROFILING

CROSS-REFERENCE TO RELATED APPLICATIONS

This application claims priority of U.S. Provisional Patent Application No. 60/110,301, filed on Nov. 30, 1998, the disclosures of which are incorporated fully herein by reference.

BACKGROUND OF THE INVENTION

This invention relates to targeting information to consumers and more particularly, to automatically, using statistical methods and psycho-demographic data generate a user profile to be used for targeting information to the consumer represented by the user profile.

An important objective in broadcasting content or advertisement is targeting. Targeting generally refers to the ability to delivering audio, video, textual or other information of interest to the recipient. For example, delivering a sporting program or a sports-related advertisement to a sports fan through a television receiver, an Internet terminal or other video or audio devices. Targeting is of increasing important due to the increase in content and cost of content, and the increasing need to maximize impact of any information delivered on the recipient.

Targeting also helps to avert certain negative reaction to advertising material. Recipients of advertising tend to react negatively to advertising material they have no interest in, and welcome those which they are interested in. Delivering target advertising not only enhances impact, but reduces the risk of negative reaction.

In order to target effectively, information on the preferences of the recipient is required. One conventional approach is to request voluntary disclosure of such information by using questionnaire and other similar communicative means. The drawbacks here are high cost of the process and low response rate, the latter resulting in incomplete coverage and therefore poor statistics. Another conventional approach is to collect such information automatically and without express consent, for example, certain digital cable boxes with two-way communication capabilities may record the television viewing habits of the viewer and automatically forward the information to a central data processing center for targeting purposes. The major drawback here is privacy concerns, which may lead to the outright ban of centralized data mining practices.

SUMMARY OF THE INVENTION

According to one aspect of the invention, a form of smart agent (SA) is provided which resides locally in a local client device and by iterative means integrates the habit, statistics and psycho-demographic information of a user to infer the user's preferences and accordingly determine a user profile. The SA may also utilize the user profile to filter information delivered to the local device. The invention further discloses a means of collecting, combining, integrating and inferring information from the user to arrive at a psycho-demographic profile of the user, and a means of utilizing such psycho-demographic profile to select or filter information delivered to the user, thereby achieving targeting. The invention also discloses a means of classifying and identifying the information delivered so that it can be matched, filtered or selected.

The present invention contemplates the information collection process to be automatic, and therefore the process does not incur cost or require effort. The invention also contemplates that the information as well as the conclusion reside in a device local to the user (unless otherwise decided by the user) so that the privacy concern is eliminated. The user profile file may be a secured file stored in the local device.

According to one aspect of the invention, content and advertisements are targeted to a user connected to Internet through an Internet terminal, such as a television receiver, a computer, a wireless electronic device, and the like. Use of the Internet, such as types of websites visited (and how often), types of contents downloaded, products purchased, and the like, is monitored and the monitored data is iteratively integrated with statistical data and psycho-demographic profile of the Internet user to develop a user profile based on the user's selections, statistical data and psycho-demographic information. Content or advertisements are transmitted to the user based on the user profile using e-mail, Java™ applets, push technologies, or other types of selective transmission means.

According to another aspect of the invention, content and advertisements are targeted to television viewers that have a television receiver and a television screen. An electronic programming guide (EPG) is displayed on the television screen. Use of the receiver and/or the EPG is monitored and the monitored data is iteratively integrated with statistical data and psycho-demographic profile of the television viewer to develop a viewer profile based on the viewer selections, statistical data and psycho-demographic information. A plurality of advertisements are transmitted to the receiver. Fewer than all the transmitted advertisements are selectively displayed on the screen to match based on the viewer profile. Preferably, the stored advertisements are displayed on the screen simultaneously with the EPG.

BRIEF DESCRIPTION OF THE DRAWINGS

The objects, advantages and features of this invention will become more apparent from a consideration of the following detailed description and the drawings in which:

FIG. 1B is a schematic block diagram of a television transmitter for practicing the invention;

FIG. 2 illustrates advertisements telecast by the transmitter of FIG. 1;

FIG. 3 is a schematic block diagram of a television receiver for practicing the invention;

FIGS. 5 to 8 illustrate the organization of a typical EPG data base;

FIG. 13 illustrates a display including an exemplary graphical icon identifying that a data address site is available with the displayed television program; and FIG. 14 illustrates a display of Internet data simultaneous with a television program display according to one embodiment.

DETAILED DESCRIPTION OF THE INVENTION

Without limiting the generality of the inventive concept, and for illustrative purposes only, the detailed description provided herein is directed to an interactive EPG for television shows which has the capability of displaying advertising, and/or providing services such as Internet browsing and search and interactive news or sports.

Figure 1A:
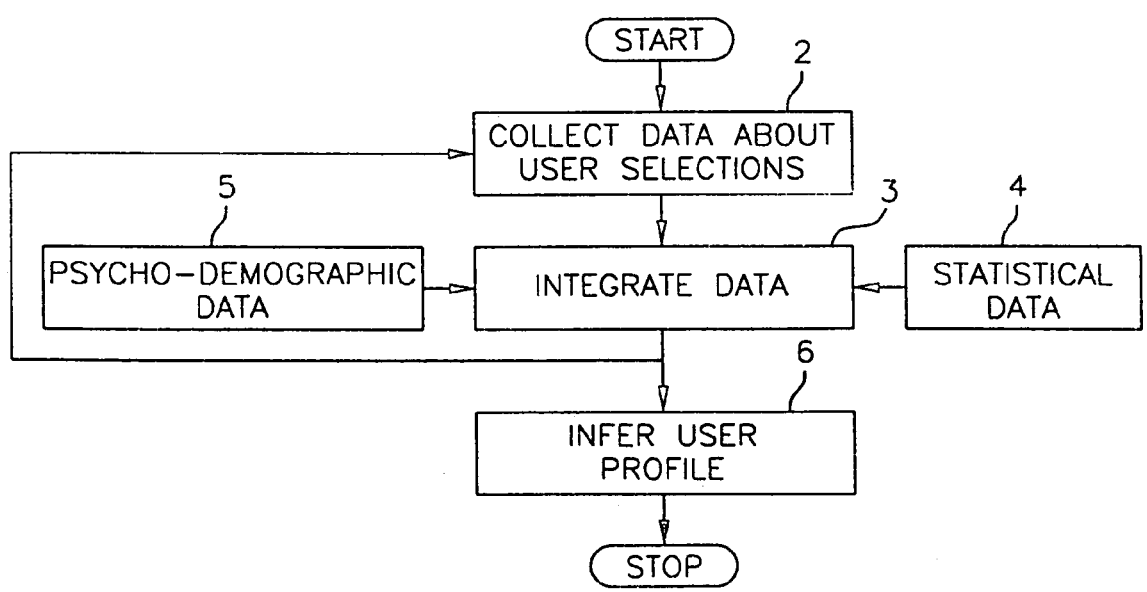
FIG. 1A illustrates a flow diagram of one embodiment of the present invention.

FIG. 1A is a flow diagram of one embodiment of the present invention. A shown in block 2, viewing habits or Internet site visits of a user is collected by a local electronic unit such as a television receiver, a set top box, a PC/TV, or the like, containing an EPG. Based on statistical methods a psychological profile of the user is constructed. The collected data is integrated in block 3 with statistical data of block 4 and psycho-demographic data of block 5 to infer the user profile, as shown in block 6. This psychological profile is comprised of a number of relevant character traits or "elements", for example, whether or not a person is a "football fan", defined, for example, as one who would definitely enjoy watching or reading about football games. Since the information collected is largely inferential and not definitive, it is not possible to answer a definite Yes or No, but rather, a probability that the answer is Yes. Thus, the fact that a person X views a certain number of football programs or visits a certain number of websites about football programs will result in a certain probability that the person is a "football fan". The more the person watches football games, the higher certainty that he or she is a football fan. In fact, the certainty may increase even if the person watches some soccer games. As more information on a given element, the probability of this Approximate Person X should approach the real character of Person X with regards to this element. The advantage of using such a probability-based psychological profile ("PBPP"), rather than a deterministic profile, is that it reflects the reality of a personality trait. There is no definiteness to a personality trait. Whether a person is a football fan or not is largely relative—relative to others, and relative to his other interests. Thus the probability model is better capable of handling the three inherent uncertainties in any such information collection process: (a) uncertainty in the definition, (b) uncertainty in the quality of information, and (c) sampling uncertainties.

This probability information may be combined with certain deterministic information such as the zip code of the user. However, the inference of this geographic information (whether it is an affluent neighborhood or not, for example), would be probabilistic in nature. The PBPP profile can be used to select the type of information (such as the type of advertising, or the type of video programming) to be provided or suggested to the user. Through the use of the PBPP, the likelihood of providing information of interest to the user is increased ("targeting").

Since this profile can be constructed with a simple set of rules and therefore can reside in the local unit (such as the television containing an EPG) without centralized processing or control, and unless the user expressly agrees to, it is not transmitted to any central processing units, it can be made to fully comply with any privacy requirements prohibiting central data mining. Nothing in this disclosure, however, confines the implementation to a local unit. Local, client-server, or full central processing configurations are all possible.

The collection of viewing habit and Internet site visits is achieved by a click stream recorder which records the programs viewed (or website visited) and the duration of viewing of each program (website). This information is stored in a memory for a certain time duration, and at the same time, used to repeatedly reinforce a probability-based psychological profile of the viewer. The raw information is then erased on a periodic basis, but when expressly agreed to by the user, may be transmitted back to a central processing unit.

Additional information that may be available for the construction of a PBPP include geographic, information such as zip code (needed to establish channel line up and therefore available), information on the cost of the television or computer such as specific model information (available), information on gender and age (optional), number of members in the household (optional) and any other relevant information.

The PBPP, together with other information (including user-controlled information), may be used to filter the information to be targeted to the user. In general, it is contemplated that the unit used by the user will have access to more information that will be provided to the user. The Filter Execution is a process whereby the PBPP and other information will be used to determine the specific information actually to be provided to the user. This is achieved generally by a probabilistic matched filter process whereby the "highest matched" set of information is passed through (the set of information with the highest "score" in a pre-defined formula encompassing the user characteristic (PBPP and other information) and the information characteristic (dependent on the information provider and objective designation)). Nothing in this disclosure precludes the use of alternative filtering methods, or the use of other filtering methods in conjunction: Other filtering methods may include absolute prohibitive filters (no information of a certain sort will be passed through), absolute selective filters (all information of a certain sort will be passed through), balancing filters (information of different categories should be presented in a "mix" consistent with the user PBPP), and the like.

The following is an illustration of a simple PBPP directed to a television viewer. It is customary for most television program provider (including networks, cable service providers, syndicators, etc.) to have a target viewer profile for each program aired (which includes gender, age, income level, educational and ethnic background, and general interest; for example, a sports talk show may target male; 35–40, medium income, high school graduate, white, sports fan as the primary target group, and male, 12–18, low income, high school student, all races, sports fan as the secondary target group etc.). Due to the need of the industry, a show is almost always associated with such a viewer profile for each unique characteristic segment.

The PBPP is comprised of a set of "elements". An example of an element is the gender. Another example is the age. Yet another example is the income bracket. A desirable, but not required, characteristic of the elements of the PBPP is that their partitions do not overlap. In mathematical terms, it is preferred for the elements to be spanned by subsets which are non-overlapping. This characteristic makes it easier to extract information from the PBPP, or to combine the PBPP with other characteristics to provide additional information. All of the examples above are such non-overlapping subsets. Some relevant elements, however, are much more difficult to be non-overlapping. For example, the element of show preferences is not easily ordered and cannot be spanned by non-overlapping subsets. The fact that one person is a sports fan does not mean he or she is not also a romantic movie viewer. However, a simple way of partitioning is to break the show preference element into a number of sub-elements, each having non-overlapping spanning subsets. For example, instead of having show preference as an element, it is broken down to "Sport Preference" which has the subset Yes or No.

The following is an example of a PBPP for a person.

$$PBPP(X) = \{\rho[Ei(X)]\}$$

where Ei(x) is the ith "element" of the character trait of a real person X, and $\rho[Ei(X)]$ is the probability that the Approximate Person X having a specific character trait. The "element" Ei may be a binary element (either Yes or No), or a multiple-outcome-element (such as age bracket) However, all multiple outcome elements can be converted into a number of binary elements. For example, the age bracket may be converted into a series of elements: Under 12—Yes or No; between 12 and 17—Yes or No, etc. Examples of Ei and their values include:

| | | |
|---|---|---|
| 1. | Gender | M or F |
| 2. | Age | Under 12, 12–17, 18–25, 26–35, 36–45, 45–55, 56 and above |
| 3. | Income bracket | Under $25,000; $25,000–$40,000 etc. |
| 4. | Sports fan | Y or N |
| 5. | Romance fan | Y or N |
| 6. | Smoker | Y or N |
| 7. | Drinker | Y or N |
| 8. | Car Buff | Y or N |
| 9. | Fashion Buff | Y or N |
| 10. | With children | Y or N |
| 11. | With babies | Y or N |

The probability $\rho[Ei(X)]$ is therefore a number between 0% and 100% which expresses the likelihood that the Approximate Person X has a given Element. For example, if $\rho[E4(x)]=75\%$, that means there is a 75% likelihood that Approximate Person X is a sports fan. The PBPP of a person can therefore be built up by integrating information which provide inference on the character element of a person. The method of construction has the following properties: (a) it can handle incomplete information—information which merely shed light on one, but not all of the elements, a simple approach is to assign a probability of 50% to all elements which the information does not shed light on: (b) it is cumulative, that is, information received are integrated in a cumulative fashion, and unless otherwise required, the raw data can be discarded after integration, (c) it is weighted, that is, various rules can be assigned to give weight to a given piece of information relative to another to reflect its impact, (d) it is adaptive meaning such rules, and other rules of integration, can change along the process. There may be other properties which are described in context below.

To construct the PBPP for Person X, the viewing habit of X is recorded. Suppose X views a Super Bowl game. Further suppose that Super Bowl has the following view statistics:

| | |
|---|---|
| Gender | M (80%), F (20%) |
| Age | Under 12 (2%), 12–17 (12%), 18–25 (20%), 26–35 (25%), 36–45 (20%) etc. |

-continued

| | |
|---|---|
| Income bracket | A profile like above |
| Sports fan | Y |
| Romantic | Low incidence |
| Smoker | High incidence |
| Drinker | Very high incidence |
| Car Buff | High incidence |
| Fashion Buff | Low incidence |
| With children | Low incidence |
| With babies | Medium incidence |

Then, by watching the Super Bowl game, Person X receives a probabilistic profile "score" as follows:

| | |
|---|---|
| Gender | M (80%), F (20%) |
| Age | Under 12 (2%), 12–17 (12%), 18–25 (20%), 26–35 (25%), 36–45 (20%) etc. |
| Income bracket | A profile like above |
| Smoker | Y 75% N 25% |
| Drinker | Y 85% N 15% |
| Likes Sports | Y 100% N 0% |
| Likes Music | Y 50% N 50% |
| Type | Classic 5% Blues 10% Rock 50% Pop 35% |
| Likes Romance | Y 25% N 75% |
| Likes Technology | Y 60% N 40% |
| Likes Cars | Y 75% N 25% |
| Likes Fashion | Y 10% N 90% |
| Has children | Y 50% N 50% |
| Has babies | Y 50% N 50% |

Note that 50% or Medium incidence in effect imparts no information, but may be useful to be retained for counting purposes. If Person X views another movie, he or she will receive another "score" (which may be different from the above "score"). More and more "scores" will be added to Person X as more and more shows that X watches is recorded. The PBPP is then computed as follows:

$$PBPP(X) = \{\epsilon 1, \epsilon 2, \epsilon 3 \ldots, \epsilon N\}$$

where $\epsilon i = \{(1/n) \Sigma j\ Ei,j\ \tau j\ \omega j, \ldots\}$

Where i identifies the elements, and the summation is over j, which identifies the events. Ei,j is the $j^{th}$ event of the $i^{th}$ element, for example, the $j^{th}$ show viewed, providing information on the $i^{th}$ element, say, Gender; $\tau j$ is the duration for which the "scoring" show is being watched, and $\omega j$ is a weighting function which can range from 0 to 1 in order to give weight or take away weight for a given show.

In short, the PBPP of Person X is defined as a running average of the "scores" he or she receives, time weighted by the duration a show is being viewed, (and/or additionally weighted for consistency and other reasons). As the number of shows increase, more statistics is contained in the PBPP. The PBPP will become the "virtual personality" of Person X for the purpose of this concept.

Clearly, the invention is not confined to the specific structure of PBPP. First, it is possible to introduce additional weighting factors to take into account other characteristics of a given show, such as the intensity of the show, the length of the show (so that the duration may be normalized by the length of the show), the day of the week, and other factors. Second, it is possible that the "score" may be a function of the number of same shows or "similar shows" watched; for example, if a person watches every episode of "Star Trek", the score of every successive Star Trek episode may be higher or lower (or first higher confirming that he is a science fiction fan; then lower—since many more additional episodes may be merely additive).

Furthermore, the invention minimizes storage space by transforming viewing characteristics from raw data to PBPP in an "on the fly" mode. However, for the purpose of extracting additional information or allowing changes in the PBPP definition, nothing prevents the raw data to be stored for any duration. Nothing prevents portions of the raw data to be stored for any duration. Nothing prevents any intermediate results of processing of the raw data, or further compilation of the raw data beyond or beside the PBPP to be stored.

In one embodiment, the invention encompasses the possibility that the PBPP may be changed, expanded, contracted, split, mapped or transformed into a new structure, when it is so determined that a new structure is more applicable. An example of the "splitting" of the PBPP to pursue a possibility that there are more than one viewer in a home is given below.

There is a high probability that there is more than one viewer in the TV Household. The following concept can be used to help determine whether this is the case, and if so, the PBPP of each person. The general notion is to look for inconsistencies that suggests the existence of more than one PBPP. Certain shows carry a strong characteristic, and are not likely to viewed if another different show is being viewed. For example, it is unlikely that a Boxing Match is watched by the same person as watching a Disney movie (not impossible, but unlikely). When such unlikely event is encountered, the possibility of a second person in the TV household exists. In this case, a two new PBPP will be created. Preferably, the second PBPP is created by copying of the original PBPP, now assigned with new labels.

$$PBPP \Rightarrow PBPP, PBPP1, PBPP2$$

When a threshold number of "inconsistencies" is recorded, the following "test" procedures will be followed: while continuing collecting scores for PBPP, a given score is separated into two consistent sets, one deposited into PBPP1, the other into PBPP2. The time-of-day of each deposit is now monitored. If over a pre-determined "test period", the time-of-day of PBPP1 deposits are bunched together (and similarly, PBPP2 deposits), then it supports the proposition that PBPP1 and PBPP2 are separate individuals, each with a dominant period of viewing. The virtual "characteristics" of the TV household is now comprised of PBPP, which is an overall average, PBPP1 (Ti), which is the first individual with dominant viewing time Ti, and PBPP (Tj), which is the second individual with dominant viewing times Tj. This information is used to help decide how to deliver customized data for individual 1 and individual 2 respectively. Alternatively, the triggering of multiple PBPP functions may be through user-provided information (through questionnaire or the use of more than one name in purchases, etc.).

In a situation of limited choices, a person's selection may be strongly influenced by the existence or non-existence of other choices. Television video programming is a particularly good example—a person first decides that he wants to be entertained by the television, then tries to find out what video program is most interesting. In a given time period on a given day, there is only a finite number of video programs available for viewing. The fact that a person selects a science fiction movie, when all movie channels are showing science fiction movies, may not carry as much weight to infer that he is a science fiction movie fan than in a situation where he chooses the science fiction movie over many other genres of programming. This Limited Selection Inference factor can be integrated into the PBPP function construction through the weighting functions $\omega i$. For example, to reflect this, $\omega i$ can be defined as v/N, where v is the number genres-present as alternatives when a selection is made, and N is the total number of genres available (for example, during the viewing selection, only 3 types of movies are available, while in total there can be 12 genres, then the weighting function $\omega i$ is $3/12 = 0.25$; if on the other hand, 10 out of 12 genres were present during the viewing selection, then the weighting function $\omega i$ is $10/12$ or 0.84, a much higher weight).

The PBPP may be integrated with external data when the latter becomes available. Deterministic data may be in the form of (a) user provided information (user declares his or her gender, age, income bracket, show preference etc.), (b) feed-back information (user makes purchases, votes, etc.), (c) inherent information (cost of unit, place of purchase—if known, geographic location—through zip code etc.), (d) and any other types of information that may be primary, secondary, through inference, as results of further research and development, or others. As pointed out earlier, even though the information is deterministic, when used to infer a character trait, it becomes probabilistic. Generally, but not always, the weight given to such information depends on its individual relevance and reliability. Certain external deterministic data may be given special treatment, such as the information that there are two or more users of the unit. This information is used to determine the number of PBPP functions that should be used for the unit.

It is possible that a mode exists in which the user is given certain control over the spectrum of information he or she may receive. In this "high user selectability" mode, user provided information will be assigned a high degree of weighting in executing the filter (see below). In addition, the information provided by the user will be separately tagged, so that the final PBPP will itself comprise of two components (in this discussion context—there can be many other components in other contexts):

$$PBPP = \Sigma j \{PBPPj(auto) + \sigma j\ PBPPj(\text{user-provided})\}$$

Here, PBPPj(auto) is the $j^{th}$ characteristic information (e.g., whether a person likes sports) developed by the statistical compilation of the viewing habit as described above, PBPPj is the same information as provided by the user (e.g. "I do not like sports" even though he or she watches sports quite often), and $\sigma j$ is a weighting function. $\sigma j$ may be increased or decreased under a variety of rules. First rule may be an external command in which the user selects full control. In which case $\sigma j$ is set to be very large. In this case, PBPP (auto) continues to be preserved because if the user one day de-selects control, $\sigma j$ will be set to very small and PBPP (auto) will take over. Second rule may be through comparison and confirmation of his self-provided information with the auto information, etc. There is an additional control which can be exercised in the Filter Execution to effect user selection, and that PBPP modification here is aimed at better understanding the characteristic of the user, while Filter Execution is aimed at shaping the response.

In the case of potential Multiple Personalities, filter execution may be integrated with user selection within a certain time duration before the execution event. For example, if the Multiple Personalities include a Sports Fan and a Romantic Movie Fan, then the filter will switch to the Sports Fan profile if (a) the television has been tuned more to sporting events than romantic movies during a period before the access of the guide, (b) sporting events have been selected and dwelled upon longer than romantic movies, or (c) a weighted average of (a) and (b) indicates that the viewer is more likely to be a Sports Fan than a Romantic Movie Fan. In making such determination, the concept of Limited Selection Inference may be applied.

In accordance with one aspect of the invention, coded advertising messages or graphics for display in panel advertisements or banner advertisements in the body of an EPG are created at a television broadcast transmitter, the headend of a cable network, or other television signal source. The codes identify the types or class of advertisements, e.g., sports equipment, clothing, automobiles, restaurants, etc. The advertisements are telecast with the television signal to user terminals that have television receivers, i.e., cable converters, VCRs, and television receivers.

In FIG. 1B, a broadcast television transmitter has a video source 10 that is coupled by a data inserter 12 to a radio frequency modulator (RF MOD) 14. A source 16 of advertisements in digital form is fed to data inserter 12 to embed the advertisements in a baseband television signal from source 10. If the television signal is analog, the advertisements are preferably embedded in its VBI. If the television signal is digital, the advertisements are preferably embedded in its digital video stream in packet form. RF MOD 14 up-converts the television signal and feeds the resulting RF signal to an antenna 16, which broadcasts the television signal to a plurality of television receivers. Alternatively, the advertisements could be inserted into the television signal of one or more channels at the headend of a cable or satellite system.

FIG. 2 illustrates the advertisements embedded in the television signal as a function of time from left to right. Advertisements A1, A2, A3, . . . , An−1, An are repeatedly transmitted, separated by intervals P in carousel fashion. The intervals P could range from zero to 24 hours. The codes that identify the types or classes of advertisements are carried by headers H1, H2, H3, . . . , Hn−1, Hn, which precede the respective advertisements A1, A2, A3, . . . , An−1, An.

In FIG. 3, one of the plurality of receivers has an antenna 20 for intercepting the television signal with embedded advertisements. Antenna 20 is coupled by a radio frequency (RF) section 22 to a tuner 24, which selects the channel for reception. Tuner 24 is coupled by a demodulator (DEMOD) 26 to a data decoder 28, which recovers the advertisements from the television signal. If the television signal is analog, decoder 28 would conventionally be a VBI decoder. The recovered advertisements with their codes are transmitted to a microprocessor 30 on a bus 32. Commands are coupled by bus 32 from microprocessor 30 to tuner 24 to change channels at the desired times. The television signal is fed through decoder 28 to a video processor 34. Video processor 34 drives a television monitor 36. The images displayed on the screen of monitor 36, which are described below, are composed in video processor 34. Reference is made to PCT International Applications WO 96/07270 and WO 99/04561, published on Mar. 7, 1996 and Jan. 28, 1999, respectively, the disclosures of which are incorporated fully herein by reference for a description of video processor 30 including a PIP chip with which it functions. (The sound producing components of the receiver are not described in detail.) An advertisement memory 38, a profile memory 40, and an EPG data base memory 42 are coupled by bus 32 to microprocessor 30 for bilateral data exchange. Although they are depicted as separate components, two or more of memories 38, 40, and 42 could be incorporated into a single RAM chip for convenience. Data and commands are also coupled by bus 32 to video processor 34 for its operation. A viewer input device 44 such as an IR remote controller issues commands to microprocessor 44 to operate the described receiver.

Figure 4:
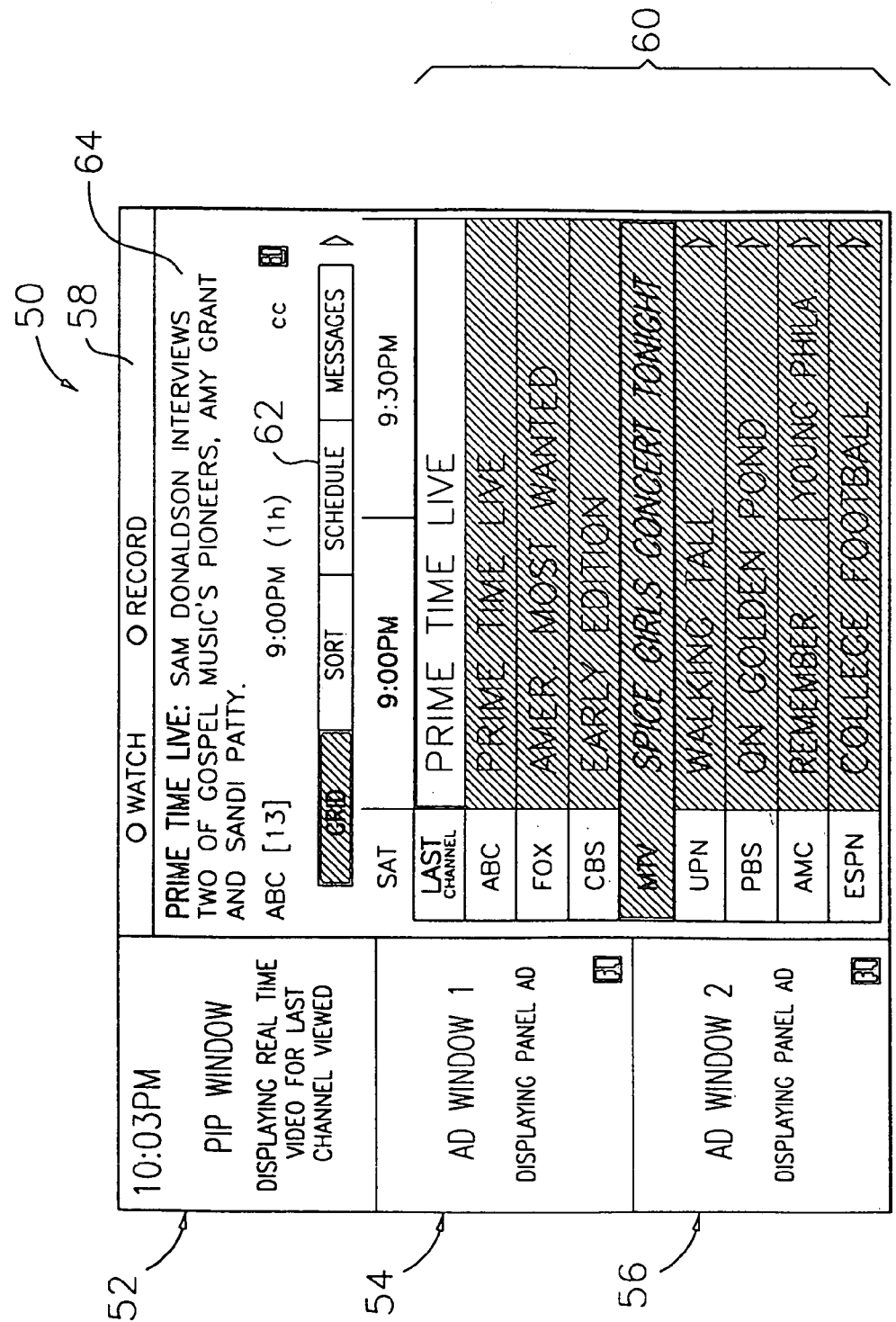
FIG. 4 illustrates a typical EPG screen on a televison monitor at the receiver of FIG. 3.

In FIG. 4, a typical EPG screen 50 generated by video processor 34 under control of microprocessor 30 is shown. Screen 50 is divided into a number of different display areas. A real time video area 52, a panel ad area 54, and a panel ad area 56 are arranged along the left side of screen 50. Video area 52 is typically produced by a PIP chip. A banner area 58 lies at the top of screen 10 adjacent to area 52. A program listing area 60 occupies the bottom two thirds of screen 50 to the right of areas 52, 54, and 56. Above area 60 lies a horizontally extending menu bar area 62 by which the viewer can select among a number of different functions. Between banner area 58 and menu bar area 62 lies a detail area 64. The use and operation of EPG screen 50 is described in PCT International Application WO 99/04561, published on Jan. 28, 1999, the disclosure of which is incorporated fully herein by reference.

The EPG data base for generating the program listings displayed on screen 50 (FIG. 4) is stored in memory 42. This data base is updated regularly, in well known fashion, for example by new EPG data downloaded in the VBI of the television signal under the control of microprocessor 30. Microprocessor 30 could set tuner 24 to the channel that carries the EPG data base at a predetermined time and then coordinate the storage of the data in memory 42.

Figure 5:
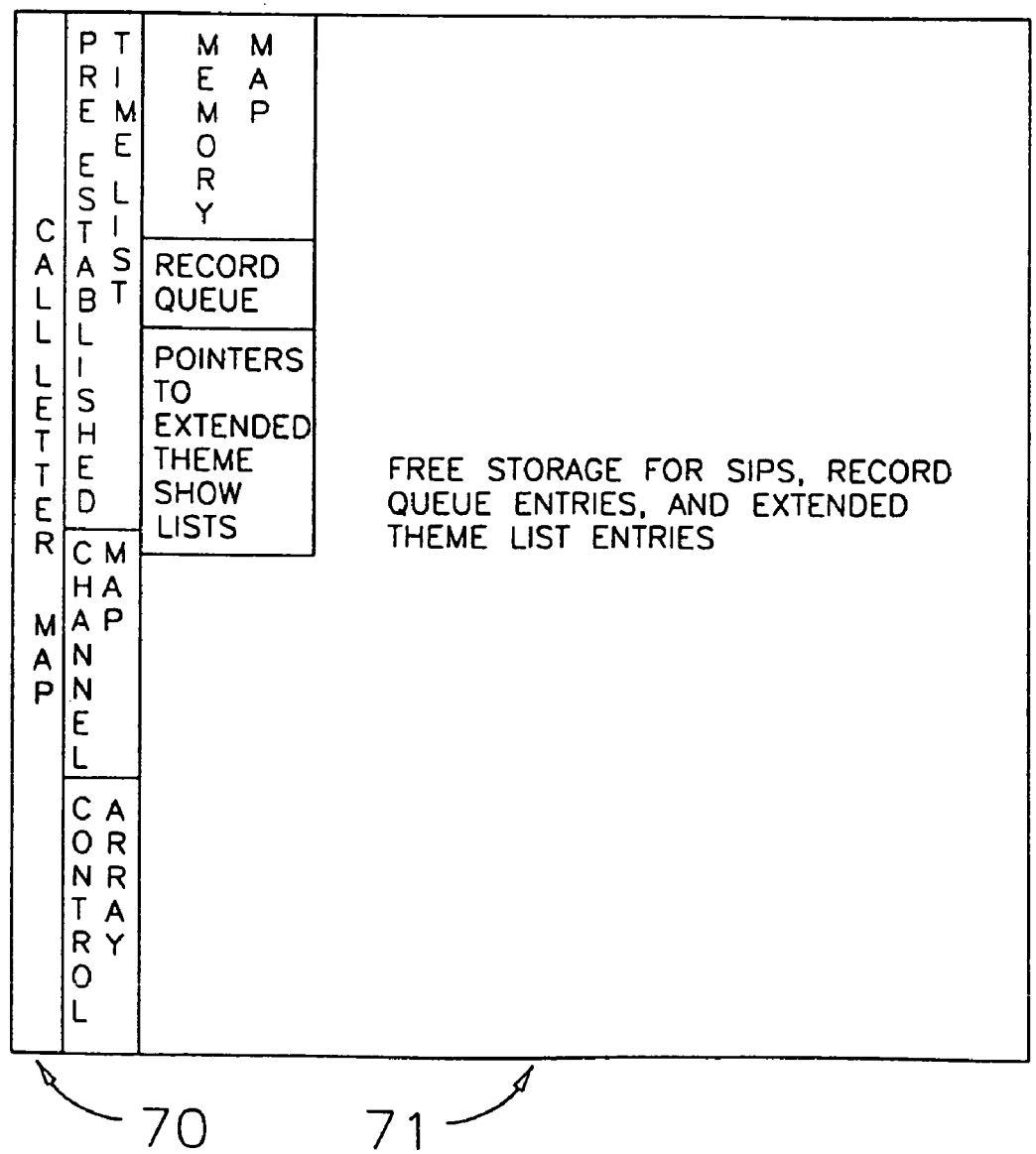

FIG. 5 depicts an exemplary program schedule memory data base. Static area 70 contains among other items a pre-established time list. This structure will be described in greater detail below. Dynamic area 71 is used to store television program schedule data. This data takes the form of show information packages (SIPs) and extended theme show list entries. These structures are also described more fully below.

Television program data is received in download packets. The download packets are sent over the VBI and received by microprocessor 30. A download packet contains television program schedule information along with routing data that enables the system to determine how to store the information in memory.

Figure 6:
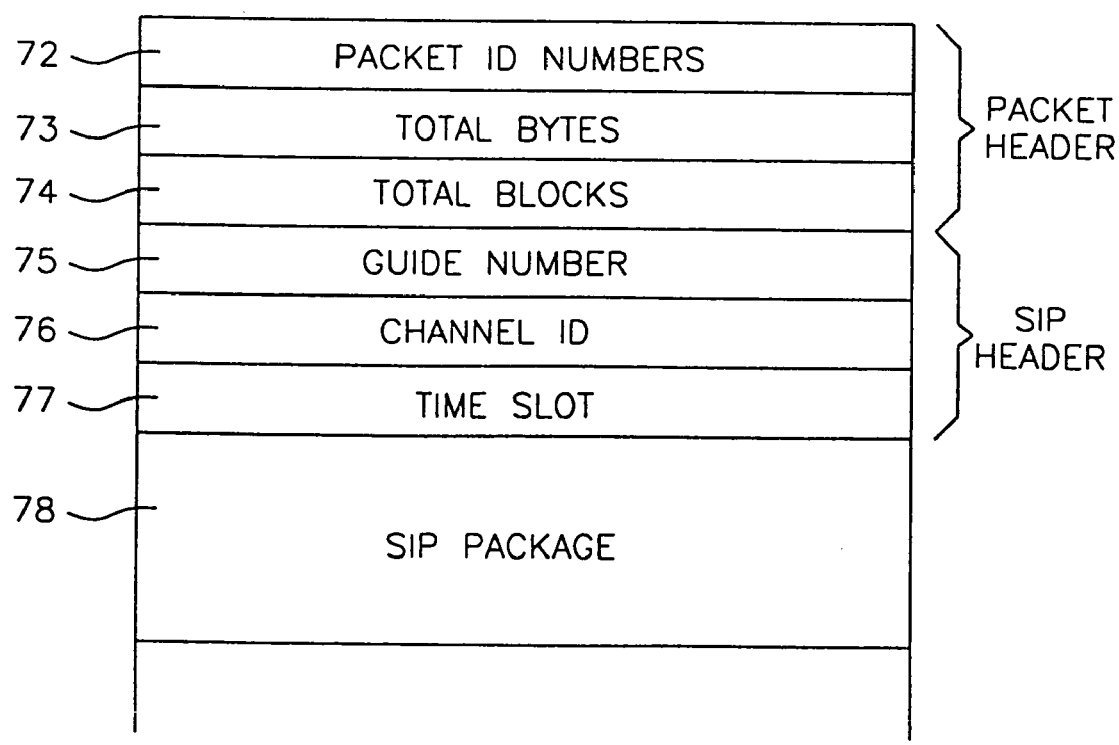

FIG. 6 illustrates an exemplary download packet. The packet begins with a packet header containing packet ID number 72 used to distinguish this packet from other packets. The packet header also contains number of bytes 73 and number of blocks 74. These values are used to determine the size of the packet.

The packet header is followed by the show information package (SIP) header. There is a show information package header for each show information package in the packet. The SIP header contains: guide number 75 used to determine the internal channel number of the data in the show information package; channel ID 76 used to determine the source of the data in the show information package; and time slot 77 used to designate the time and day of the data in the show information package. A show information package 78 follows the SIP header.

Upon receipt, the system microprocessor extracts a show information package from the download packet and temporarily stores it in program schedule memory. The show information package contains a date field that is used to determine if the data is for the current day(today) or the next day(tomorrow).

If the package falls within this two day window the system determines if the data is duplicate of existing data. The show information package contains a version number used to determine if the data is new or if it already exists in memory. If the data is new then it is stored and the address of the show information package is placed in the appropriate pointer in the pre-established time list. The pre-established time list will be explained more fully below.

If the show information package is outside of the current two-day window (today and tomorrow) and the show information package contains programs that have theme information, those programs with theme information are pulled out of the show information package and placed in the appropriate extended theme show list. The extended theme show list is described more fully below. If the show information package is outside of the current two-day window and does not contain theme information, or if the show information package is duplicative of one that is already stored the entire show information package is discarded.

Data in the program schedule memory is stored in data structures that enable the system to interpret the data. Several of the data structures are of fixed length and reside in the static area 70. Other data structures are of variable length and reside in the dynamic area 71. The fixed data structures include: the pre-established time list, the channel map, the control array, the call letter map, the memory map and the record queue. The variable data structures include: show information packages and extended theme show lists.

The pre-established time list is used to locate television program information for each channel in the system. The pre-established time list only references program information that will be broadcast on the current day (today) or on the next day (tomorrow). The pre-established time list references data through the use of pointers which are pieces of data that contain addresses of desired data items.

FIG. 7 illustrates the pre-established time list. The pre-established time list contains a set of twelve pointers 41 for each channel in the system. Each pointer corresponds to a show information package that contains data for a four hour block of television programming. For example, in FIG. 7, the pointer E1 corresponds to program data from four p.m. to eight p.m. Twelve pointers represent 24 hours of programming information for the current day and 24 hours of program information for the next day.

Referring to FIG. 8, pointers A2 through L2 are used to represent the program data associated with the second channel in the system. Each pointer contains an address of a show information package of variable length containing actual television program data. When specific data is needed, microprocessor 30 first looks in the pre-established time list to secure the pointer, then uses the address found in that location to determine where the data is actually stored. For example, if data for the second channel in the system is needed for a television program between eight p.m. and twelve midnight the system will use the address in pointer F2 to determine the location of the show information package containing the data.

Show information packages are variable length data structures that contain actual television program schedule data. Each show information package contains data for a four hour block of television programming for a specific channel. The show information package length is variable because the number of shows in each four hour block will depend on the durations of the individual shows.

FIG. 8 depicts a show information package. A show information package contains the following: amount of memory—used to determine how much space was used to store the show information package and therefore, how much space is freed up after the show information package is no longer needed; control date—used to determine whether the data in a specific show information package is for the current day, the next day, or outside of the current two-day window; and version number used to specify the specific version of the program data.

Following these three fields is specific data for each show that fits within the four-hour time block. For a given show, represented by block 80, the following fields are present in the show information package: multiple show flag field—used to determine if this show is the last show within the package, or if there are other shows following to be processed; start time field—an offset from the start time of the four-hour block, this offset is added to the time of the four-hour block to determine the start time of the show; duration field—specifies the air time for the particular show; theme field—contains information on the type of show; for example, the show may be a sporting event, a news program, or a movie; CC field determines whether or not the show is closed captioned; stereo field—determines whether or not the show is broadcast in stereo; add-ons field—is a field left for expansion, this field will contain more information about the show as that information becomes standard in the art.

Following these fields are fields representing program title, primary description—a short description of the program, secondary description—a longer description of the program and VCR+PLUSCODE. Each of these items are represented by two fields, one containing the length of a specific item, such as title length, and one containing the item itself, such as title.

Following this information is an end-of-show field. The end-of-show field is used to indicate that the information for that particular show is finished. A show information package may contain information for one or more shows depending on how many shows are broadcast within the four hour block. The presence of multiple shows is represented by 81 and 82.

A show information package is structured so as to provide several unique features for storing data. The title length, primary description length, secondary description length and VCR+PLUSCODE length fields can be expanded for values that are beyond the maximum value that can be stored within one byte. For example, referring to FIG. 8, if the secondary description length is greater than the maximum value that can be stored within one byte, the length byte is set to the maximum value. The system then assumes that the following byte is also a length byte and adds the two values to determine the length of the secondary description. In this way, a show information package can dynamically allocate space to accommodate longer descriptions or longer titles.

The end-of-show field allows for the inclusion of data in the show information package that is not read by the current version of the system. As shown in FIG. 8, following the VCR+PLUSCODE field, there are two fields of unspecified data. This is data which may be read by future versions of the system but is currently not processed by the current system. When processing show information package data the system will discard this data until it reads an end-of-show field. The system will not begin processing data for a new show until an end-of-show field is found. This feature allows the system to access the same data as a potential future version which may incorporate more data.

At each user terminal, the usage of the user terminal, i.e. which programs are watched, how often, and for how long, or the usage of the EPG, i.e., which programs are selected for scheduling to record, to watch or to display more details, or which programs are highlighted with the cursor and how often, is monitored and processed by microprocessor 30 as part of creating the viewer profile as described above. In one embodiment, this profile is maintained, i.e., stored, in memory 40 as a secure file at each user terminal to preserve viewer privacy. Thus, unauthorized parties do not have access to the profile. In other words, the viewer profile cannot be uploaded to another location such as a service center, a headend, or an Internet website.

Alternatively, only part of the user profile, namely, the privacy-sensitive part, e.g., the user name and other information, is retained as a secure file, and other commercially useful anonymous marketing information about usage is transmitted to a remote processing center via telephone line, pager, the Internet etc. for analysis.

In addition to its normal function of providing the information to generate the displayed program listings, the EPG data base combined with other information and statistical data may also be used to generate the viewer profile at the viewer terminal as described above. As a result, the privacy of the data about viewer watching habits is not compromised by sending it to a remote location.

By way of example, the microprocessor could monitor the setting of tuner 24 and keep a log of the time, day, and duration that the tuner is set at each channel and program category designators could be stored in the EPG data base as part of the information about each program. The actual programs or program titles or program category designators could be identified from the time, day, and duration of the tuner by use of the EPG data base resident in the user terminal. Each time tuner 24 is reset, the channel and time could be used by microprocessor 30 to access the show information package (SIP) for the program being telecast on the channel at that time via the time-channel table and the corresponding pointer. The category of the program used to generate the category program guides could be recovered from the SIP by microprocessor 30 for use in formulating the viewer profile. Each time tuner 24 is reset the time interval since the last tuner reset is used by microprocessor 30 with the category of the program telecast on that channel during the interval to generate an accumulated value of viewing time of programs in that category. Thus, memory 40 can tally all the viewing time of the categories in this way to be used in determining the viewer profile. If desired, specially tailored program categories different from those used to generate the category program guides could be stored in the SIPs and be used in combination with statistical data and psycho-demographic information to determine viewer profile, as described above.

In the case of the data base structure described above, microprocessor 30 is programmed to obtain the pointer to the desired SIP from the pre-established time list based on time as read from a real time clock and channel as read from the tuner. Microprocessor 30 then reads the category from the SIP for the time and channel. Instead of monitoring tuner 24, the program categories could be transmitted in the VBI of each program itself in real time much as XDS or parental control ratings. However, this requires the cooperation of the television signal provider to accomplish.

The profile determined at a user terminal is correlated with the transmitted advertisement codes in headers H1, H2, H3, . . . , Hn−1, Hn, so microprocessor 30 can earmark the transmitted advertisements A1, A2, A3, . . . , An−1, An−2 that would be of greatest interest to a person represented by the profile file based on statistical data and psycho-demographic information.

More sophisticated correlation schemes such as that disclosed in application No. 60/110,301 could also be employed to correlate the targeted information to the user profile. To conserve local memory space, part of the processing could be performed at a central location, if privacy is not a concern.

In the case of advertisement targeting, as an advertisement is received at a user terminal, its code is compared with the user profile. (In the simple correlation scheme described above, the advertisement code is directly compared with the code or codes of the profile.) If a match is detected, the advertisement is stored in memory 38 for later display in area 54 and/or 56 of the television screen in the EPG (FIG. 4). If the code of the advertisement indicates that the advertisement is not of interest, the advertisement is not stored in memory 38. This conserves memory space in the user terminal. Preferably, a number of advertisements so pinpointed to the user's interest, as reflected by the profile, are stored and and accessed in rotation for display in the EPG according to a prescribed schedule as described in application No. 60/141/331, filed on Jun. 28, 1999, the disclosure of which is incorporated herein fully by reference. Although it is preferable to transmit the advertisements and their codes with a television signal, they could alternatively be transmitted in a separate link, such as a pager channel or over the Internet.

It is not the intention of the description to restrict the invention in any way or form to the EPG, but to use the EPG as an effective example. The video in the example may be any type of information, the guide may be any list or category of information, the advertising may be any form of promotion that may involve video and audio information as well as text and graphics. For example, should there be a "guide" for video tapes available in rental stores, the same principle can apply. Similarly, should there be a guide of products or services (such as catalogs for electronic commerce), the same principle can apply to target readers or audience. Furthermore, the invention is not limited to any particular hardware configuration and will have increased utility as new combinations of computers, television systems, communication devices, and the like are developed.

The Internet has recently been popularized by the rapid success of the World Wide Web (WWW or Web). The Web links together a variety of computers from around the world and various topics in a non-sequential web of associations which permit a user to browse from one topic to another, regardless of the format and order of topics. Users access and browse the Web using a web browser that generally resides and is executed on the user's computer. Commercially available web browsers such as Netscape's Navigator™ and Microsoft Internet Explorer™ are common and accessible by computer users. The web browser allows a user to retrieve and render hyper-media content from the network of computers within the Web, including text, sound, video and other types of data. These hyper-media contents are stored on different websites.

Websites are locations on server computers that are accessible through Internet. A variety of information, such as hyper media contents and databases can be stored on a website and be access by users with computers connected to the Internet. To serve up pages, websites need a server (a host computer) and server software that runs on the Server. The host computer manages the communication protocols and houses the pages and related software required to create a website on the Internet. Host computers spread throughout the Internet can house different websites.

The Internet works based on a client/server model. In this model, a client computer communicates with a server computer on which information resides and the client computer depends on the server to deliver requested information and services. These services may involve searching for information and sending it back to the client, such as when a database on the Web is queried. Other examples of these services are delivering web pages through a website, and handling incoming and outgoing e-mail. Typically, the client is a personal computer (PC) user using a browser to connect to and search the servers, however, the present invention may also be implemented on a PCTV, a set top box, a television including special hardware, or the like. The servers are usually more powerful computers that house the data and databases. The client/server model enables the Web to be conceived of a limitless file storage medium and, distributed among thousands of host computers, all accessible by any individual user.

The Internet has grown so quickly and its resources are so vast that users need help navigating around it by using special software called agents to help them access the Net's resources. Simply put, agents are programs that perform users' searches and bidding automatically. Agents can find the latest news and download it to the user computer; they can automatically monitor Internet traffic and report on its total usage; they can find the best deal on the a mechanize that a user wants to buy; they can perform important Web maintenance tasks; and the like. These agents are software programs that are invisible to the user. The user determines the task to be done by the agent and behind the scenes the agent automatically goes off and performs that task. A variety of different languages can be used to write agent programs.

For instance, a simple Internet agent is one that gathers news from a variety of sources while the user is not using a computer or while the user is using the computer for another task. A news agent can work in several ways. In the simplest example, the user fills out a form saying what kind of news the user is interested in and on what schedule the user wants the news delivered. Based on that information, at pre-set intervals, the news agent dials into news sites around the Internet and downloads news stories to the user's computer where the user can read them as HTML pages.

In one aspect of the present invention, a smart agent residing locally in a local client device iterative integrates the habit, statistical data and psycho-demographic information of an Internet user to infer the user's profile. The smart agent may also utilize the preference to filter information delivered to the local device. Specifically, the agent collects, combines, integrates and infers information from the user to arrive at a psycho-demographic profile of the user and utilizes such psycho-demographic profile to select or filter information delivered to the user, thereby achieving targeting. The agent is also capable of classifying and identifying the information delivered so that the information can be matched, filtered or selected easily.

The agent is a software program designed to collect information such as the types and frequency of websites visited and the information retrieved by the user. The software program then combines the collected information with statistical data and psycho-demographic information to arrive at a psycho-demographic profile of the user. The agent may also search the Internet for information of interest to the user based-on the user's profile on websites, public Usenet Newsgroups, and the like. The data retrieved by the software applet may be entered into an algorithm that produces a sorted list based on the user profile. According to one embodiment of the invention, the software program is written in the Java™ programming language. The software applet may also be written using ActiveX™, or other known Internet programming technologies.

According to one embodiment of the invention, the system uses tables and records to store and organize data for construction of the user profile. The system organizes the tables and records into a database stored in the local device. The database may be structured as a relational database, tabular database, hierarchical database, object-oriented database, and the like. The layout and information contained in the various tables may vary based on the type of data being utilized. The user record includes the user's preference and psycho-demographic information, as well as a history of user interactions with the Internet and various websites. The user record also includes the user's information including the user's name, gender, age group, income level, e-mail address, and the like. The user record may also include a user rating table field with an index to a user's rating table. The user's rating table includes a list of subject matters, product types, brand names, and the like. Each entry further includes a user rating given to the particular entry. The user rating indicates a user's rating of the brand as "yes," "no," "like," "dislike," "don't care," or "don't know." Users may indicate their preferences or indifference for an entry by selecting a button adjacent to the entry corresponding to the above-mentioned ratings. The agent uses the entry rating information, in combination with other data to arrive at a user profile, as described above. Thus, the system can filter information or retrieve information from Internet according to the user's profile. The information includes promotional information, advertisement, or any other information related to a particular subject matter.

Increasingly, the Internet is becoming a broadcast medium. Instead of users taking it upon themselves to visit certain sites, information, entire websites, and applications can be sent via the Internet straight to users' computers with a variety of technologies collectively know as push technology. In push technology, typically users subscribe to websites, often called channels. A channel generally refers to an area of interest that a site publisher builds, which can include HTML pages, Java™ applets, ActiveX™ components, multimedia objects, and other information packaged together to deliver customized information to users via push technology. The subscribed sites and the information they contain are sent to the users automatically at specified intervals.

Receiving these channels requires either special client software or a push-enabled browser. Typically, push technology is built into browers such as Netscape Communicator™ and Microsoft Internet Explorer™. Push client software is also available from other companies. Most push technologies allows the users to customize the kind of information that they receive. This kind of customization is one benefit that push technologies offer. Another benefits is the time savings—instead of having to go out and gather the information, the information is delivered to the users with no effort on their part, and it's the kind of information that interests them.

According to one aspect of the invention, when a profile for a user is determined, push technologies are used to deliver to the user specific information of interest, such as particular product information or advertisements, based on the determined user profile.

Figure 9:
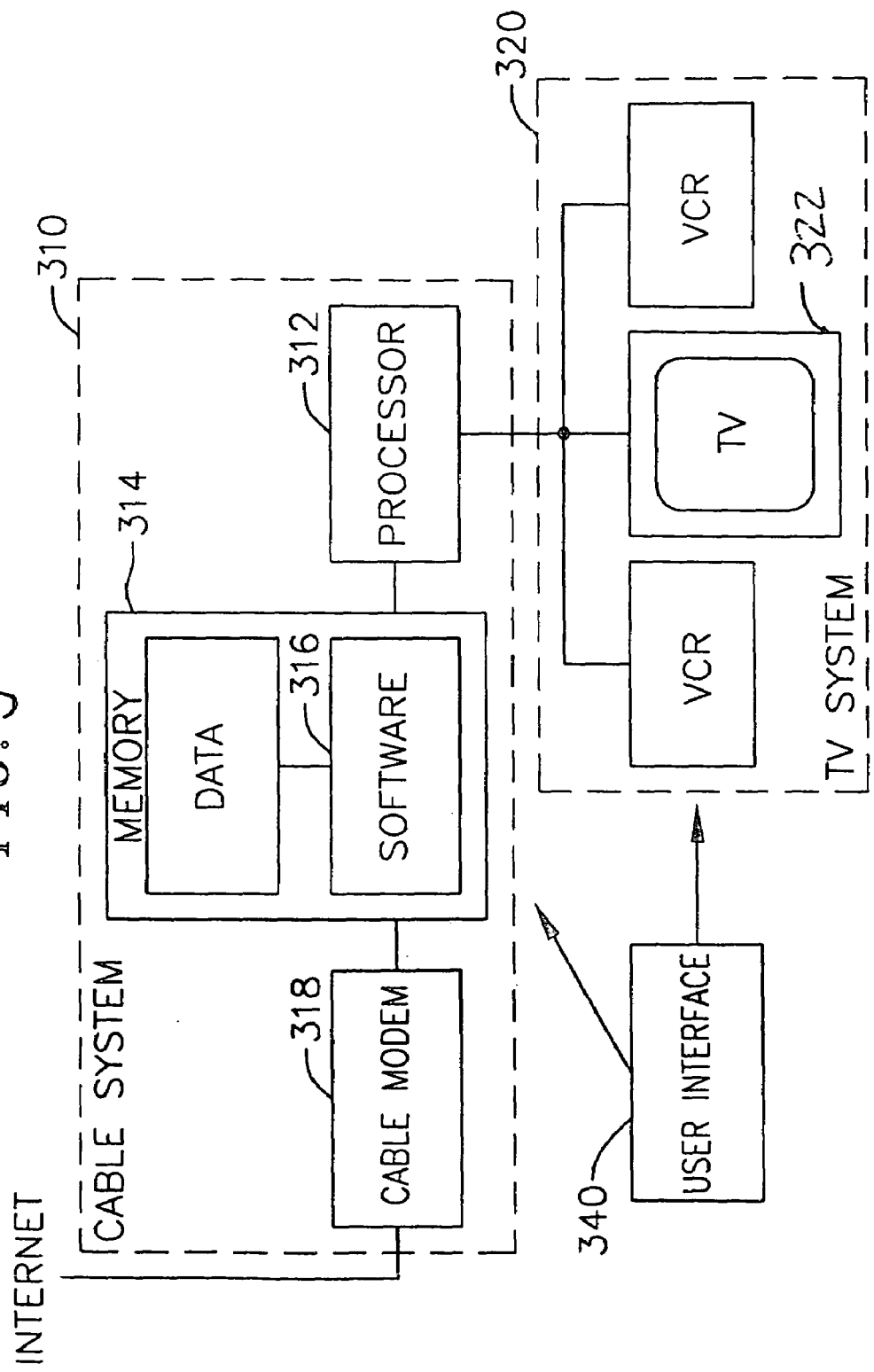
FIG. 9 illustrates an interactive television schedule system incorporating a cable system.
Figure 10:
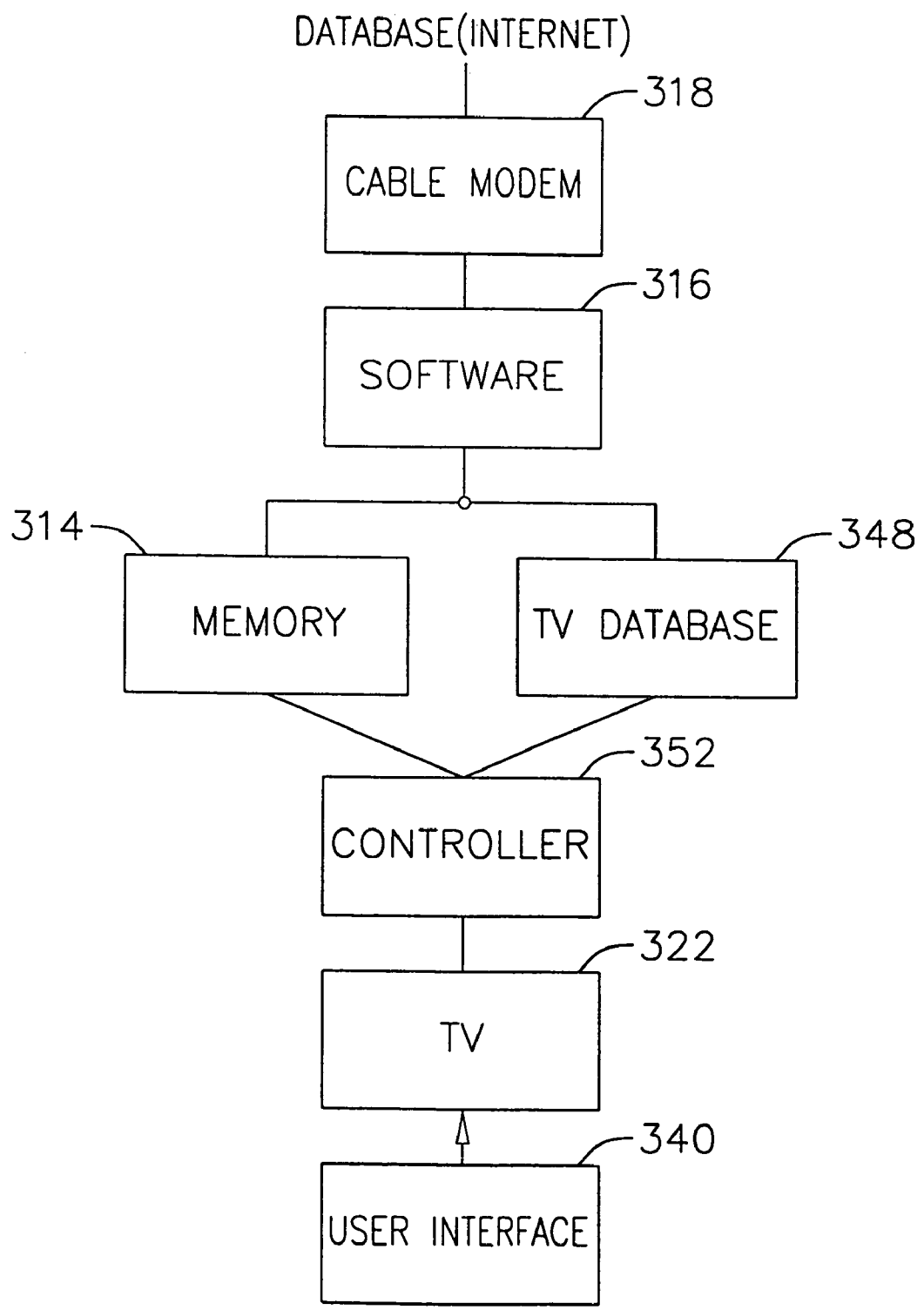
FIG. 10 illustrates an arrangement for providing schedule information to a television system.

FIGS. 9 and 10 illustrate an interactive television schedule system 300 according to one embodiment of the present invention which can access television schedule information from the Internet, and provide user access to the Internet. Access to the Internet may be provided in this embodiment without tying up any phone lines, and without the need for a personal computer. An interactive television system including access to Internet and advertisers, and contextual searching of the Internet is described in U.S. patent application Ser. No. 08/837,078, filed on Apr. 11, 1997 and entitles "SYSTEMS AND METHODS FOR LINKING TELEVISION VIEWERS WITH ADVERTISERS AND BROADCASTERS," the entire contents of which are hereby expressly incorporated by reference. As shown in FIG. 9, the interactive television schedule system includes a cable system 310 coupled to a television system 320. Cable system 310 generally includes a processor 312, and a memory 314. Television system 320 includes a television 322 and a user interface device 340. Television system-320 may also include a VCRs coupled to television 322. In a specific embodiment, memory 314 of cable system 310 stores software 316 for receiving, organizing, and displaying schedule data and other data. In addition to software 316, data for the basic schedule information, data related to the user profile, and other related data (e.g., data relating to a particular show) are also stored in memory 314. In one embodiment, a portion of this data is received via a cable modem 318, which may access the data from the Internet. Other portion of data is generated by the processor 312. The software 316 then utilizes the data received from cable modem 318 to generate a television schedule guide. The user can access this generated television schedule guide when desired.

FIG. 10 illustrates an arrangement for providing television schedule information from cable system 310 to a television for display. In one embodiment, cable modem 318 provides access to a database, which may be on-line; the database contains the television schedule information, and the information is transmitted to the television. Software 316 stored in memory 314 is used to search for and provide the information, along with providing several other features including determination of user profile according to the present invention. The data may be stored in memory 314 within cable system 310, or within a database 348 within television 322. A controller 352 is used to obtain the data from memory 314 or from database 348 to display it on television 322. From the television schedule guide, the user can further utilize user interface 340 to press a "Services" button. This Services button can be located on the user interface or within the television schedule guide display. When the Services button is pressed, the user is given choices such as News, Weather, Sports, Scores, Financial Data, Local Traffic, Network, etc. based on the user preferences determined by the user profile. Using the user interface, the user can then select an area or a title, and the associated information from the database is provided.

The user can further access the Internet by choosing Network from the guide using the user interface. Cable modem 318 accesses the Internet, and once connection is made, the user has two-way communication with on-line service providers. The user can then access the different on-line services. For example, a user viewing a sporting event may press the Services button, and a different menu based on the user profile will appear with the following choices: (1) Sports Scores, (2) Current Game Statistics, (3) Current Player Statistics, and (4) Associated Products based on the user profile. If the user selects (4) Associated Products, the software, will notify the cable modem and instruct the cable modem to establish connection with an on-line service provider. The on-line service provider then lists a series of selections associated with the game (e.g., 49er's hats, Giant's Baseball Bats from Louisville Slugger, Nike Spiked Football shoes for Pop Warner, etc.), and the user can interact with the service provider accordingly to order and purchase the product.

Figure 11:
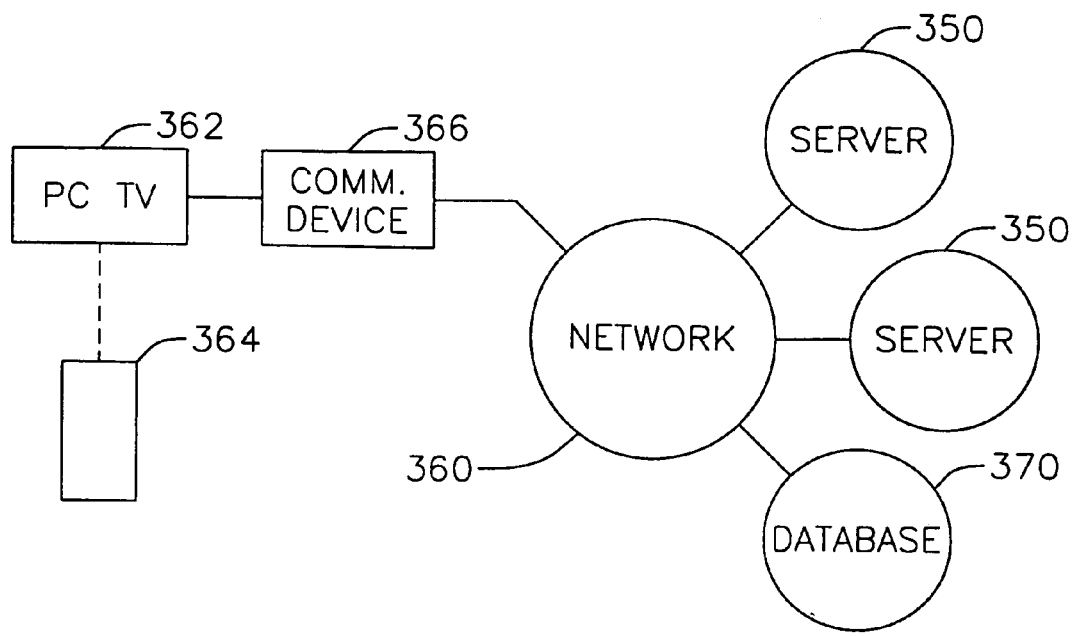
FIG. 11 illustrates a system and method for accessing information at a network file server.

FIG. 11 illustrates a system and method for accessing television schedule information from one or more servers 350 on a computer network 360, such as the Internet or the World Wide Web. The television information guide may be accessed and viewed through a computer system, a television system, a PCTV, or a simple display coupled to a communication link, such as a telephone line or the like. In the representative embodiment, a PCTV 362 is illustrated with a user input device 364, such as a remote control, with a keyboard, mouse or the like, and a communication device 366 for accessing computer network 360. Communication device 366 may include a wide variety of data lines, such as telephone lines, cable modems, satellite links, and the like.

In one embodiment, the computer network 360 includes a plurality of servers 350 and a database 370. The database 370 includes television schedule information, which may be retrieved and viewed on PCTV 362. Servers 350 represent file servers having files, databases or the like. In a representative embodiment, the computer network is the World Wide Web and each server 350 is set up as a network file server addressable by a unique address. For example, the servers 350 may be configured to follow a common network protocol such as the Transmission Control Protocol (TCP), and the Internet Protocol (IP) (commonly referred to collectively as TCP/IP), and may be assigned a unique IP address or Internet domain name. For example, the servers may be assigned the domain name "guide.com." The servers 350 may also have some form of server software installed to permit the system to function as an Internet graphics server. For example, the servers 350 may be configured with HyperText Transport Protocol (HTTP) server software to permit the system to function as an Internet Web server. In this embodiment, PCTV 362 may access servers 350 via the Web using Web compatible software by indicating the system's uniform resource locator address: "HTTP://www.guide.com".

In another embodiment, the television schedule guide (not shown) is stored as one or more files (e.g., a websites or Internet broadcast transmitters) on one of the servers 350, which can be accessed by any viewer having access to the Web. The television schedule guide or website may be configured for viewing and interacting with television information directly on-line, or it may be configured for downloading the information into a computer hard drive or other suitable processor. The guide provides listings information for all channels in the viewer's local cable lineup. Preferably, the guide is capable of creating personalized TV listings with search and sort features that allow the viewer to call up favorite programming choices based on categories, such as channel, day, actor, movie genre or other desired categories. The guide may also include other information about programs, such as ratings, stars, type of movie (e.g., suspense, comedy, drama, western, musical, children, biography, horror, etc.). This information may be provided on the actual website and/or Internet broadcast transmitter, or the website and/or Internet broadcast transmitter may provide means for linking the viewer with other websites and/or Internet broadcast transmitter to provide more information on certain topics and categories.

In one embodiment of the present invention, the system includes a search engine that allows the viewer to search for particular types of programs that will be broadcast within a certain period of time. The search engine may include categories such as title, description, category, dates, day parts, channels, actor/actresses, directors, etc. In addition, the viewer may obtain more information on the programs within each category.

For example, the guide could provide information on movies in many categories, including theatrical, made-for- TV movies, Spanish, French, etc. The guide is capable of informing the user what Clint Eastwood movies are on this week, how many StarTrek episodes this weekend, or whether a favorite basketball team is on TV this Saturday. The on-line viewers may customize their own listings by title, year, actors, director, run themes, critical star rating, MPAA, warning lines, video laser disc, full descriptions, genre, and holidays with themes. In another example, the guide could provide information on shows and series, including network shows, first run, British, PBS, cult favorites, syndicated shows, talk shows, local productions and obscure programs. The user may sort by, for example, title, episode run times, genre, original air date, etc. Data related to these user's selections is utilized in combination with other data to automatically generate a user profile, as described above.

In another aspect of the invention, the system includes a variety of files on the same or different network servers that allow the user to interact with other users, program sponsors, advertisers, etc. For example, the system may have a website that allows viewers to chat about certain programs (each program itself may have its own website). In addition, the system may include a "virtual agent" that searches existing websites and/or Internet broadcast transmitter on the Internet and points to websites and/or internet broadcast transmitters that may interest the viewer based on the automatically generated user profile. The virtual agent also learns from the user choices to customize the television guide.

Figure 12:
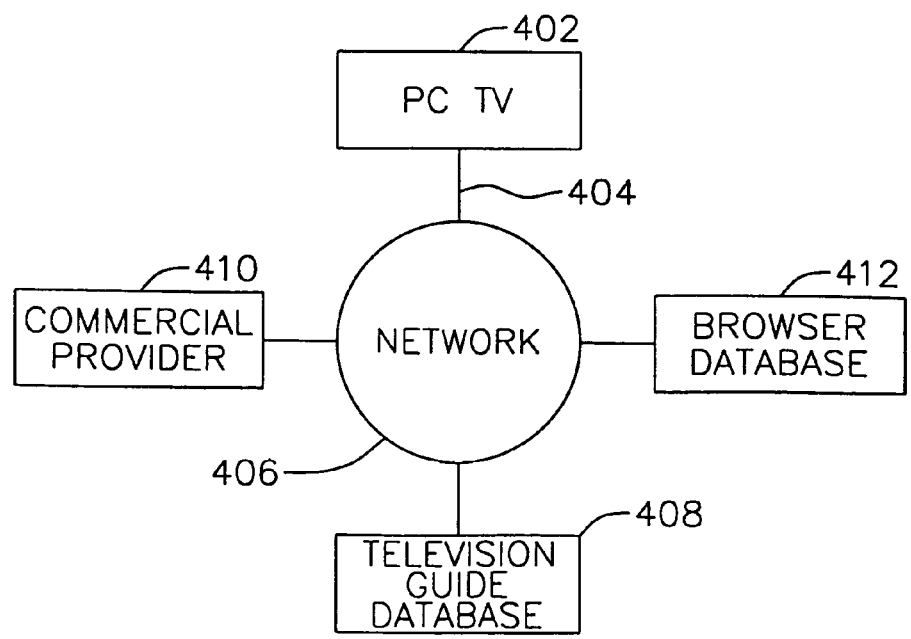
FIG. 12 illustrates a system and method for user interaction with advertisers and program sponsors.

FIG. 12 schematically illustrates a system and method according to the present invention for linking television viewers with broadcasters and advertisers during the broadcast of a commercial or program. As shown, system 400 includes a viewer interface 402, such as a television, computer, PCTV or a television coupled to a computer system. For convenience, the system will be described as utilizing a PCTV 402. A data line 404, such as a cable modem, 4 telephone line or other communication link, couples the PCTV 402 with a remote database, network server or on-line-service, such as the Internet 406. A television guide database 408 is also coupled to the Internet 406 for providing the television schedule information to PCTV 402. This information may be downloaded to PCTV 402, or it may be configured for viewing only while the viewer is actually connected to database 408. Alternatively, the television guide may be drawn locally from a processor within PCTV. As shown, a commercial provider 410 (e.g., Coke™) and/or a television station broadcaster 412 (e.g., ABC) also have databases coupled to PCTV 402 through Internet 406.

PCTV 402 may include a memory and a processor with appropriate software (not shown) for searching and retrieving information including promotional information and advertisements from databases on the Internet 406 based on user profile. Alternatively, this function may be provided through Internet 406, television guide database 408 or through the commercial provider 410 or broadcaster 412. The software may also selectively filter the information directed to the viewer based on the user profile to achieve targeting. In this embodiment, PCTV may access, download, and/or automatically upgrade an application or applet (e.g., a Java™ applet) having the appropriate software to run the television schedule guide on a display, e.g., a computer monitor, television display or other user interface.

In one example, the viewer is watching a sports event, such as a football game. One or more icons or other visual indicators are located on the television screen in a convenient location, such as the top, right corner. One of these icons may be an icon that represents the television schedule guide. The viewer can move a cursor or other visual indicator to the television guide icon and click thereon to open up the television guide as discussed in detail below. Another icon may be provided, for example, by a commercial sponsor targeting the particular viewer based on the user profile. Moving into and activating this icon allows the viewer to link with a database provided by the commercial sponsor, or to a portion of the television schedule guide database that allows the viewer to purchase an advertised product, make a monetary contribution, respond to a survey, answer a question, or participating in contests with other viewers, for example. This type of advertising allows the advertiser to directly target a particular viewer or particular program and it allows the viewer to directly purchase the advertised product during the advertisement.

In another example, the television network that is broadcasting the program may provide an icon that allows the viewer to access a database 412 providing more information about the J football game, previews of upcoming related programs, such as another football game later on in the week, or other products and services based on the user profile.

As shown in FIG. 13, a graphical icon 95 appears on the screen of television 322 when the television program is displayed full screen, i.e., in a television mode, to inform the viewer that Internet data accompanies the television signal. Icon 95 can appear for a limited time period after the television program is first displayed or for the entire time period of the program. If the viewer wishes to access an Internet site in connection with the television program, the viewer presses a button on a remote controller, which introduces an Internet mode of operation described below. Microprocessor 312 is programmed to carry out this operation. By repeatedly pressing the button, the viewer can toggle back and forth between the television mode and the Internet mode.

In one embodiment, the Internet site information is placed in a picture-in-picture ("PIP") window on the television screen such that the Internet site information may be viewed simultaneously with the television program. Conversely, the television signal may be placed in a PIP window on the television screen as shown in FIG. 14. In this embodiment, the Internet site information occupies the majority of the television screen, and the television program is displayed in a PIP window. In this manner, the television video signal may be viewed simultaneously with the Internet information, and thus supplement the information provided to the viewer.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method of determining a profile of a user based on statistical data and psycho-demographic information about the user, the method comprising the steps of:

storing statistical data and psycho-demographic information that is based on probability-based character traits about a plurality of contents;

collecting data about user selections of a portion of the plurality of contents;

iteratively integrating the collected user selections data with the stored statistical data and the psycho-demographic information about the user selections of a portion of the plurality of contents; and inferring the profile of the user from the integrated information.

2. A method for determining a profile of a user based on statistical data and psycho-demographic information about the user, the method comprising the steps of:

collecting data about user selections;

iteratively integrating the collected selections data with the statistical data and the psycho-demographic information about the user; and inferring the profile of the user from the integrated information wherein, the step of inferring the profile (UP) is determined by the equation:

$$UP(X)=\{\rho[Ei(X)]\}$$

where Ei(x) is the ith element of the character trait of a real person X, and $\rho[Ei(X)]$ is the probability of the person X having a specific character trait.

3. The method of claim 2 wherein, the element Ei is a binary element.

4. The method of claim 2 wherein, the element Ei is a multiple-outcome-element.

5. The method of claim 2 wherein, the step of iteratively integrating comprises iteratively integrating the collected selections with the statistical data and the psycho-demographic information in a cumulative fashion.

6. The method of claim 5 wherein, the collected selections data is disregarded after the integration step.

7. The method of claim 5 wherein, the step of inferring the profile (UP) is determined by the equation:

$$UP(X)=\{\epsilon 1, \epsilon 2, \epsilon 3, \ldots, \epsilon N\}$$

where $\upsilon i=\{(1/n) \Sigma j\ Ei,j\ \tau j\ \omega j, \ldots\}$, i identifies the elements, j identifies events being utilized by the person X, Ei,j is the jth event of the ith element, providing information on the ith element, $\tau j$ is the duration for which event j is being utilized, and $\omega j$ is a weighting function to give weight or take away weight for a given event and having a range from 0 to 1.

8. The method of claim 7 wherein, $\omega j$ is a function of one or more of the intensity of the event, the length of the event, the day of the week, and the time of the day.

9. The method of claim 1 wherein, the user is a television viewer having a television receiver and the step of collecting comprises collecting data about the viewer's television program selections.

10. The method of claim 9 wherein, the step of collecting comprises collecting data about television programs watched by the viewer.

11. The method of claim 9 wherein, the step of collecting comprises collecting data about television programs selected in an EPG.

12. The method of claim 9 wherein, the step of collecting comprises collecting data about television programs scheduled for recording or watching in an EPG.

13. The method of claim 9 wherein, the step of inferring the profile (UP) is determined by the equation:

$$UP(X)=\{\epsilon 1, \epsilon 2, \epsilon 3, \ldots, \epsilon N\}$$

where $\epsilon i=\{(1/n) \Sigma j\ Ei,j\ \tau j\ \omega j, \ldots\}$, i identifies the elements, j identifies the television program being watched by the television viewer X, Ei,j is the jth television program of the ith element, providing information on the ith element, ij is the duration for which the television program j is being watched, and $\omega j$ is a weighting function to give weight or take away weight for a given television program and having a range from 0 to 1.

14. The method of claim 9 further comprising the step of targeting information to the television viewer based on the profile.

15. The method of claim 14 wherein, the information is advertisement.

16. The method of claim 15 wherein, the advertisement includes one or more of text, still image, and video.

17. The method of claim 14 wherein, the information is displayed simultaneously with an EPG on a display.

18. The method of claim 1, further comprising the step of maintaining the profile in a secure file.

19. The method of claim 9, further comprising the step of storing an EPG data base at the receiver, the EPG data base including time, channel, and program category identifiers of telecast television programs; and collecting step collects data about the program categories of telecast television programs selected by the viewer.

20. The method of claim 1 wherein, the user is an Internet user having an Internet terminal for accessing the Internet and the step of collecting comprises collecting data about the user's website selections.

21. The method of claim 20 wherein, the step of collecting comprises collecting data about websites visited by the user.

22. The method of claim 21 wherein, the step of collecting comprises collecting data about products purchased the user from the visited website.

23. The method of claim 20 wherein, the accessing the Internet is initiated from an EPG.

24. The method of claim 20 wherein, the step of inferring the profile (UP) is determined by the equation:

$$UP(X)=\{\epsilon 1, \epsilon 2, \epsilon 3, \ldots, \epsilon N\}$$

where $\epsilon i=\{(1/n) \Sigma j\ Ei,j\ \tau j\ \omega j, \ldots\}$, i identifies the elements, j identifies the website being visited by the Internet user X, Ei,j is the jth visited website of the ith element, providing information on the ith element, $\tau j$ is the duration for which the website j is being visited, and $\omega j$ is a weighting function to give weight or take away weight for a given website and having a range from 0 to 1.

25. The method of claim 20 further comprising the step of targeting information to the Internet user based on the profile.

26. The method of claim 20 wherein, the information is advertisement.

27. The method of claim 26 wherein, the advertisement includes one or more of text, still image, and video.

28. The method of claim 20 wherein, the information is displayed simultaneously with an EPG on the Internet terminal.

29. A method of inferring a preference profile of a user utilizing general populous statistical data and psycho-demographic information about the user, the profile having a plurality of unique characteristic segments, the method comprising the steps of:

monitoring user selections iteratively collecting data about the user selections with respect to each of the unique characteristic segments;

iteratively assigning probabilities to each of the collected unique characteristic segments;

integrating each of the collected unique characteristic segments with assigned probabilities derived from the general populous statistical data and with the psycho-demographic information about the user that is based on probability-based character traits; and inferring the profile of the user from the integrated information.

30. A method for inferring a preference profile of a user utilizing general populous statistical data and psycho-demographic information about the user, the profile having a plurality of unique characteristic segments, the method comprising the steps of:

monitoring user selections iteratively collecting data about the user selections with respect to each of the unique characteristic segments;

iteratively assigning probabilities to each of the collected unique characteristic segments;

integrating each of the collected unique characteristic segments with assigned probabilities derived from the general populous statistical data and with the psycho-demographic information about the user; and inferring the profile of the user from the integrated information wherein, the step of inferring the profile (UP) is determined by the equation:

$$UP(X) = \{\rho[Ei(X)]\}$$

where $Ei(x)$ is the ith element of the character trait of a real person X, and $\rho[Ei(X)]$ is the probability of the person X having a specific character trait.

31. The method of claim 30 wherein, the step of inferring the profile (UP) is determined by the equation:

$$UP(X) = \{\epsilon 1, \epsilon 2, \epsilon 3, \ldots, \epsilon N\}$$

where $\epsilon i = \{(1/n) \Sigma j\ Ei,j\ \tau j\ \omega j, \ldots\}$, i identifies the elements, j identifies events being utilized by the person X, $Ei,j$ is the jth event of the ith element, providing information on the ith element, $\tau j$ is the duration for which event j is being utilized, and $\omega j$ is a weighting function to give weight or take away weight for a given event and having a range from 0 to 1.

32. The method of claim 31 wherein, $\omega i$ is defined as v/N, where v is the number selections present as alternatives when a selection is made, and N is the total number of selections available.

33. The method of claim 31 wherein, the user is a television viewer having a television receiver, the events are television programs being viewed by the viewer, and the step of collecting comprises collecting data about the viewer's television program selections.

34. The method of claim 31 wherein, the user is an Internet user having an Internet terminal for accessing the Internet, the events are websites being visited by the Internet user, and the step of collecting comprises collecting data about the user's website selections.

35. The method of claim 29 further comprising the steps of:

recording a predetermine number of inconsistencies of the user selections;

separating the user profile into two consistent sets, a first user profile and a second user profile, while continuing collecting data for the user profile;

monitoring the time-of-day for each collected data for the first and second user profiles;

inferring that the first user profile and the second user profile are for different individuals if over a predetermined period the time-of-day of the first user profile data is grouped together and the time-of-day of the second user profile data is grouped together.

36. The method of claim 29 further comprising the step of integrating external data with the collected data.

37. The method of claim 36 wherein, the external data is one or more of user provided information, feedback information, inherent information, and inferred information.

38. The method of claim 37 wherein, the user provided information includes user assignable weighting.

39. A system for inferring preference profile of a user utilizing general populous statistical data and psycho-demographic information about the user comprising:

a plurality of unique characteristic segments included in the profile;

means for monitoring user selections;

means for iteratively collecting data about the user selections with respect to each of the unique characteristic segments;

means for iteratively assigning probabilities to each of the collected unique characteristic segments;

means for integrating each of the collected unique characteristic segments with assigned probabilities derived from the general populous statistical data and with the psycho-demographic information about the user that is based on probability-based character traits; and means for inferring the profile of the user from the integrated information.

40. The system of claim 39 wherein, the means for integrating and the means for inferring is local to the user.

41. The system of claim 39 wherein, the means for integrating and the means for inferring is remote to the user.

42. A system for inferring preference profile of a user utilizing general populous statistical data and psycho-demographic information about the user comprising:

a plurality of unique characteristic segments included in the profile;

means for monitoring user selections;

means for iteratively collecting data about the user selections with respect to each of the unique characteristic segments;

means for iteratively assigning probabilities to each of the collected unique characteristic segments;

means for integrating each of the collected unique characteristic segments with assigned probabilities derived from the general populous statistical data and with the psycho-demographic information about the user; and means for inferring the profile of the user from the integrated information wherein, means for inferring the profile (UP) is a microprocessor computing the equation:

$$UP(X) = \{\rho[Ei(X)]\}$$

where $Ei(x)$ is the ith element of the character trait of a real person X, and $\rho[Ei(X)]$ is the probability of the person X having a specific character trait.

43. The system of claim 42 wherein, the means for inferring the profile (UP) is a microprocessor computing the equation:

$$UP(X) = \{\epsilon 1, \epsilon 2, \epsilon 3, \ldots \epsilon N\}$$

where $\epsilon i = \{(1/n) \Sigma j\ Ei,j\ \tau j\ \Omega j, \ldots\}$, i identifies the elements, j identifies events being utilized by the person X, $Ei,j$ is the jth event of the ith element, providing information on the ith element, $\tau j$ is the duration for which event j is being utilized, and $\omega j$ is a weighting function to give weight or take away weight for a given event and having a range from 0 to 1.

44. The system of claim 43 wherein, the user is a television viewer having a television receiver, the events are television programs being viewed by the viewer, and the means for collecting comprises means for collecting data about the viewer's television program selections.

45. The system of claim 43 wherein, the means for collecting comprises means for collecting data about television programs selected in an EPG.

46. The system of claim 43 wherein, the user is an Internet user having an Internet terminal for accessing the Internet, the events are websites being visited by the Internet user, and the means for collecting comprises means for collecting data about the user's website selections.

* * * * *